United States Patent
Sereda et al.

[11] 3,721,917
[45] March 20, 1973

[54] GAS-DISCHARGE DEVICES FOR OPTICAL PUMPING OF LASERS

[76] Inventors: Nikolai Ivanovich Sereda, Zelengrad, korpus 503, kv. 18; Viktor Viktorovich Sysun, Zelengrad, korpus 707, kv, 71; Boris Vasilievich Skvortsov, Zelengrad, korpus 511, kv. 58; Viktor Davydovich Fisher, ulitsa Tuchkovskaya, 9, kv. 151; Alexandr Vasilievich Tolstoshev, Inovokuznetsky pereulok, 10, kv. 18, all of Moscow, U.S.S.R.

[22] Filed: June 17, 1971

[21] Appl. No.: 153,972

[52] U.S. Cl. ................. 331/94.5, 313/220, 330/4.3
[51] Int. Cl. .................................................. H01s 3/09
[58] Field of Search ........ 331/94.5; 330/4.3; 313/220

[56] References Cited

UNITED STATES PATENTS

| | | | |
|---|---|---|---|
| 3,560,872 | 2/1971 | Heimann | 331/94.5 |
| 3,516,009 | 6/1970 | Lipsett | 331/94.5 |

*Primary Examiner*—William L. Sikes
*Attorney*—Eric H. Waters et al.

[57] ABSTRACT

A gas-discharge device for optical pumping of lasers, in which a gas-filled chamber encloses an optically transparent laser-material holding tube and at least one optically transparent cylindrical discharge tube. This discharge tube is arranged inside the chamber so that the electrode assemblies between which an electric discharge is initiated to produce a gas-discharge plasma are found inside the discharge tube which has a slot to allow part of the plasma to spill over into the chamber.

4 Claims, 2 Drawing Figures

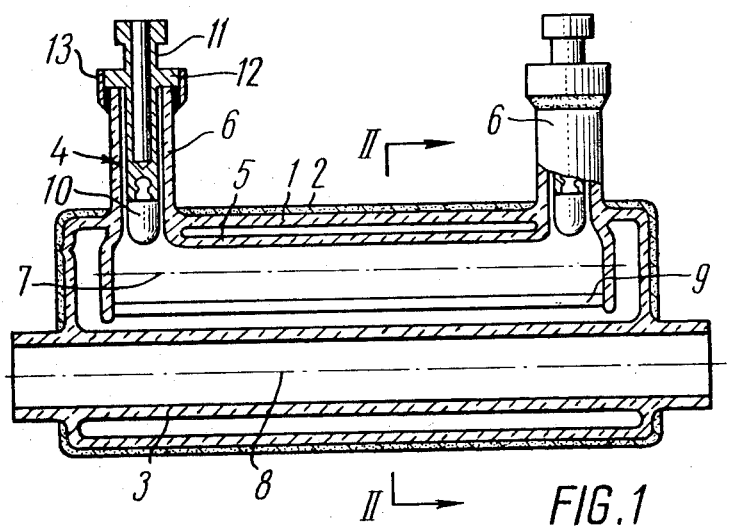
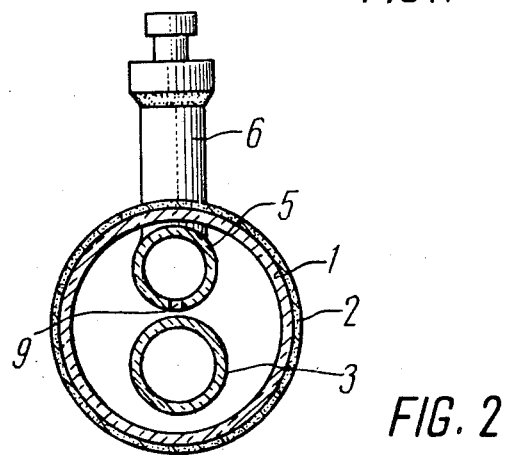

GAS-DISCHARGE DEVICES FOR OPTICAL PUMPING OF LASERS

The present invention relates to gas-discharge light sources and, more specifically, to gas-discharge devices for optical pumping of lasers.

In the prior art, there are gas-discharge devices for optical pumping of lasers, comprising a gas-filled chamber with light-reflecting walls, inside which an optically transparent laser-material holding tube is placed, while at the opposite sides of the chamber there are electrode assemblies between which an electric discharge is initiated to produce a gas-discharge plasma.

In these prior-art devices, the laser-material holding tube is arranged concentrically with the chamber so that the discharge-produced plasma is contained and stabilized by the walls of the laser-material holding tube and chamber. As a result, the walls of the tube and chamber have to stand up to an increased thermal load, and this leads to a reduced peak energy of the electric discharge and a short service life of the device. Besides, the plasma fills the chamber non-uniformly when these devices are operated under nominal operating conditions.

It is an object of the present invention to provide a compact and convenient-to-make gas-discharge device for the optical pumping of lasers.

Another object of the present invention is to provide a gas-discharge device for the optical pumping of lasers which brings down the maximum thermal load on the chamber walls with the result that the peak energy of the electric discharge is raised and the service life of the device is extended.

With these and other objects in view, the present invention resides in that in a gas-discharge device for the optical pumping of lasers, comprising a gas-filled chamber with light-reflecting walls, inside which there is an optically transparent laser-material holding tube and at the opposite sides of the chamber there are electrode assemblies between which an electric discharge is initiated to produce a gas-discharge plasma, according to the invention, there is an optically transparent cylindrical discharge tube placed inside the chamber so that the electrode assemblies are found inside this discharge tube which has a slot to allow the gas-discharge plasma to spill over into the chamber.

In order to prevent axial shock waves from striking the electrode assemblies, it is preferable that the optically transparent cylindrical discharge tube should be the shape of an U, its longitudinal axis should be parallel with the axis of the laser-material holding tube, and the slot should be made the whole length of the discharge tube and along its generatrix, on the side facing the laser-material holding tube.

In order that the split-over plasma may have a higher temperature, it is preferable that the width of the slot be not greater than one-third of the inside diameter of the discharge tube.

To simplify the manufacture of the device disclosed herein, the chamber, laser-material holding tube, and discharge tube may all be made of the same composition of glass, and the light-reflecting coat on the chamber walls may be fabricated from amorphous silicon dioxide.

Thus constructed and arranged, the gas-discharge device for the optical pumping of lasers disclosed herein improves the efficiency of laser pumping and, the utilization of the applied energy raises the peak energy of the electric discharge and has a longer service life.

The present invention will be more fully understood from the following description of a preferred embodiment when read in connection with the accompanying drawings wherein:

FIG. 1 shows a longitudinal section through a gas-discharge device for optical pumping of lasers according to the invention, and a general view of one of the arms of an optically transparent cylindrical discharge tube;

FIG. 2 is section II—II of FIG. 1.

Referring to FIG. 1, there is a gas-discharge device for optical pumping of lasers, comprising a gas-filled chamber 1 whose walls have a light-reflecting coat 2. Inside the chamber 1, there is an optically transparent laser-material holding tube 3, while at the opposite sides of the chamber 1 there are electrode assemblies 4 between which an electric discharge is initiated to produce a gas-discharge plasma.

The chamber 1 also holds an optically transparent cylindrical discharge tube 5 arranged in the chamber 1 so that the electrode assemblies 4 are found inside this discharge tube 5.

In the embodiment in question, the optically transparent cylindrical discharge tube 5 is in the shape of an U, with its arms 6 enclosing the electrode assemblies 4, as is clearly seen from FIG. 1. The longitudinal axis 7 of the discharge tube 5 runs parallel with the parallel axis 8 of the laser-material holding tube 3.

To allow part of the gas-discharge plasma to spill over into the chamber 1, the cylindrical discharge tube 5 (FIGS. 1 and 2) has a slot 9 extending the whole length of the discharge tube and along its generatrix, on the side facing the laser-material holding tube 3. The width of the slot 9 is not more than one-third of the inside diameter of the discharge tube 5.

The chamber 1, the laser-material holding tube 3, and the discharge tube 5 are all made of the same composition of glass, in this case fused quartz glass, and the light-reflecting coat 2 on the walls of the chamber 1 is fabricated from amorphous silicon dioxide fused to zero porosity at the surface.

Each electrode assembly 4 (FIG. 1) consists of a thoriated-tungsten electrode 10 and a rotary holder 11 which has a spigot 12 giving support to a titanium cylinder 13 which forms an annular gap with the arm 6, filled with a solder, in this case tin, during the sealing operation.

In the case of high-power gas-discharge devices for the optical pumping of lasers, according to the invention, two, three or more optically transparent cylindrical discharge tubes 5 may be placed in the chamber so as to ensure a more uniform distribution of the incident radiation on the surface of the optically transparent laser-material holding tube 3, and the gas-discharge plasma may be allowed to spill over into the chamber 1 through the slots 9 of these tubes simultaneously or with a shift in time.

The gas-discharge device for the optical pumping of lasers disclosed herein operates as follows.

A voltage is applied from a discharge circuit (not shown) to the electrodes 10 (FIG. 1). After that, a firing pulse is applied to these electrodes, so that an electric discharge strikes between the electrodes 10 inside the discharge tube 5, producing a gas-discharge plasma.

As the plasma column expands, part of it spills over through the slot 9 into the chamber 1, thereby moderating the effect of this plasma and shock waves on the walls of the discharge tube 5. Since the slot 9 is made to extend over the whole length of the discharge tube on the side facing the laser-material holding tube 3, the utilization of the applied energy is improved.

The gas-discharge device for the optical pumping of lasers disclosed herein makes it possible to construct, by simple means and at low labor requirements, compact and convenient-to-use lasers of high performance and long service life.

What is claimed is:

1. A discharge device for optical pumping of lasers, comprising: a gas-filled chamber having light-reflecting walls; an optically transparent tube arranged within said chamber for holding the laser material; electrode assemblies located at opposite sides of said chamber, between which an electric discharge is adapted to be initiated to produce a gas-discharge plasma; at least one optically transparent cylindrical discharge tube being positioned within said chamber, said electrode assemblies being disposed within said discharge tube, and a slot being provided in and extending along the length of said discharge tube to allow part of said plasma to spill over into said chamber.

2. A gas-discharge device, as in claim 1, in which said optically transparent cylindrical discharge tube is in the shape of an U, the longitudinal axis of this tube runs parallel with the longitudinal axis of said laser-material holding tube, and said slot is made the whole length of said discharge tube and along its generatrix, on the side facing said laser-material holding tube.

3. A gas-discharge device, as in claim 2, in which the width of said slot is not more than one-third of the inside diameter of said discharge tube.

4. A gas-discharge device, as in claim 1, in which said chamber, said laser-material holding tube, and said discharge tube are all made of the same composition of glass, and the light-reflecting coat on the walls of said chamber is fabricated from amorphous silicon dioxide.

* * * * *